UNITED STATES PATENT OFFICE.

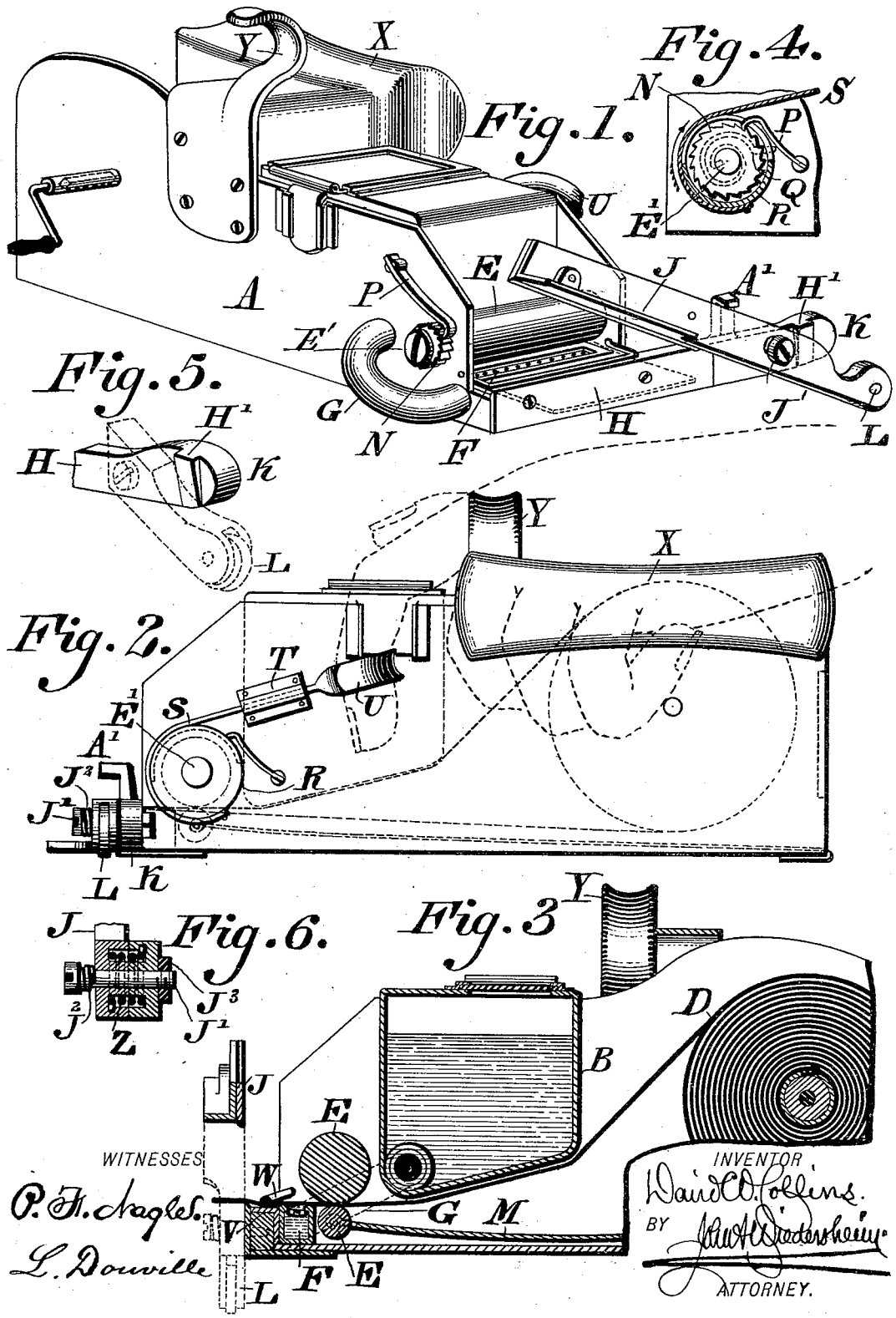

DAVID W. COLLINS, OF PHILADELPHIA, PENNSYLVANIA.

APPARATUS FOR GUMMING AND CUTTING STRIPS, LABELS, &c.

SPECIFICATION forming part of Letters Patent No. 508,682, dated November 14, 1893.

Application filed April 5, 1893. Serial No. 469,084. (No model.)

*To all whom it may concern:*

Be it known that I, DAVID W. COLLINS, a citizen of the United States, residing in the city and county of Philadelphia, State of Pennsylvania, have invented a new and useful Improvement in Apparatus for Gumming and Cutting Strips, Labels, &c., for Mailing and other Purposes, which improvement is fully set forth in the following specification and accompanying drawings.

My invention consists of an apparatus or device adapted to be carried by the hand, and operated so as to effectively gum or paste strips, and sever or cut the same in uniform lengths or sizes, the work being conveniently, and practically accomplished, as will be hereinafter set forth.

Figure 1 represents a perspective view of a gumming or cutting apparatus embodying my invention. Fig. 2 represents a side elevation thereof. Fig. 3 represents a longitudinal vertical section thereof. Fig. 4 represents a section of a portion of the feeding device. Fig. 5 represents a perspective view of a portion of the cutting device. Fig. 6 represents a transverse section of the cutting device.

Similar letters of reference indicate corresponding parts in the several figures.

Referring to the drawings: A designates a frame having thereon the gum or paste cup B, the drum or reel C for the roll D, the feed rollers E, the distributing trough F, the supply tube G leading from said cup to said trough, the bed knife H, and movable blade or cutter J, the latter being pivoted to the frame A, and having a lateral extension forming a heel or foot K, on whose outer end is journaled the roller L.

The lower roller E is mounted on the free end of the spring arm M the other end being secured to the frame A, and the axis E' of the upper roller carries the ratchets N with which engage the check pawls P for preventing improper return motion of said roller, said axis having also secured to it a spring Q, one end of which is connected with the pulley R, the latter being loosely mounted on the axis E', but connected with the same by means of said spring Q. A band S passes around the pulley R, and is passed through the guide T on the side of the frame A, its outer end having a finger piece U secured to it, whereby the pulley may be rotated in one direction, while the return motion is effected by the spring Q, and thus the strip D which is passed between the rollers E, E, may be fed forward over the trough F and the bed knife. Between the bed knife and the trough is a rest V, above which is a pivoted presser bar W, which firmly holds the strip, while being cut or severed, the same being adapted to be raised when the strip is to be passed thereunder.

On the frame A is a handle X and finger piece Y, whereby the device may be firmly grasped. Between the cutter J and the head of the axial pin J' thereof is a coiled spring $J^2$, and on the threaded end of said pin is a nut $J^3$, whereby the tension of said spring may be adjusted, and the closeness of the blades accordingly regulated. When the strip has been advanced sufficiently beyond the bed knife, as shown in Fig. 3, the foot K is raised whereby the cutter J is forced against the strip, and a proper length of the latter is cut off. The cutter J is then raised, due to a spring Z on the axis thereof, and then the pulley R is operated, whereby another length of the strip is fed forward. As the strip passes over the trough F, the gum or paste which is directed thereinto from the cup B, through the tube G, comes in contact with the under side of the strip, and when the latter is cut or severed, a pasted strip or label drops from the bed knife, and the same may be applied to a wrapper or other article as desired, or placed in bundles or piles, it being evident that the strip is uniformly supplied with gum without liability of the latter to spread or soften the paper or strip, so that the cutting may be quickly, accurately and practically accomplished, and the device is light and compact, and may be conveniently handled.

The return motion of the cutter head J is limited by the stop A' on the frame A, as most plainly seen in Fig. 1. On the outer face of the heel end of the bed knife H is a wedge-shaped lug H', against which the inner face of the foot K rides as it ascends when the blade or cutter J descends, whereby the cutting edge of said cutter is held close against the cutting edge of the bed knife, owing to the opening in the cutter being somewhat larger than the axial pin J', and thus the cutting is effected.

Having thus described my invention, what I claim as new, and desire to secure by Letters Patent, is—

1. An apparatus for the purpose named consisting of a frame, a paste cup thereon, a drum mounted therein, feed rollers, one of which is provided with a yielding support, a distributing trough, a supply tube leading from said cup to said trough, a bed knife, a movable blade having a heel with a roller journaled thereon, a pulley on the journal of one of said feed rollers, and mechanism substantially as described for operating said pulley, said parts being combined substantially as described.

2. In an apparatus for the purpose set forth, a frame having a handle and finger piece, the drum C mounted on said frame, the paste cup B, and trough F in said frame with connecting tube G, the rollers E, the lower of which is mounted on the spring M, the pulley R on the journal of the upper feed roller, with the band S connected therewith, the finger piece U secured to said band S, guides T for said band, the bed knife H and the movable cutter J with a roller on its foot, and the stop A' on the frame, said parts being combined substantially as described.

3. A frame, a paste cup and a paste trough with connecting tube, a drum journaled on said frame, feed rollers adjacent to said trough, a bed knife secured to said frame, a movable blade having a foot thereon, a wedge-shaped lug on said frame against which the foot of the movable blade bears, and a pulley on one of said rollers with a connecting band for rotating in one direction, and a spring for rotating it in the opposite directions, said parts being combined substantially as described.

DAVID W. COLLINS.

Witnesses:
JOHN A. WIEDERSHEIM,
R. H. GRAESER.